United States Patent
Shi et al.

(10) Patent No.: US 12,202,520 B2
(45) Date of Patent: *Jan. 21, 2025

(54) AUTONOMOUS VEHICLE HANDLING IN UNUSUAL DRIVING EVENTS

(71) Applicant: TUSIMPLE, INC., San Diego, CA (US)

(72) Inventors: Zhujia Shi, San Diego, CA (US); Mingdong Wang, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/316,895

(22) Filed: May 12, 2023

(65) Prior Publication Data

US 2023/0278586 A1 Sep. 7, 2023

Related U.S. Application Data

(63) Continuation of application No. 17/105,073, filed on Nov. 25, 2020, now Pat. No. 11,648,961.

(51) Int. Cl.
*B60W 60/00* (2020.01)
*B60W 10/20* (2006.01)
(Continued)

(52) U.S. Cl.
CPC ........ *B60W 60/0015* (2020.02); *B60W 10/20* (2013.01); *B60W 30/09* (2013.01); *B60W 30/0956* (2013.01); *B60W 30/143* (2013.01); *B60W 30/18163* (2013.01); *B60W 40/04* (2013.01); *B60W 40/06* (2013.01);
(Continued)

(58) Field of Classification Search
CPC .. B60W 60/0015; B60W 10/20; B60W 30/09; B60W 30/0956; B60W 30/143; B60W 30/18163; B60W 40/04; B60W 40/06; B60W 2554/20; B60W 2554/4042; B60W 2554/801; B60W 2420/42;
(Continued)

(56) References Cited

U.S. PATENT DOCUMENTS 9,475,491 B1 10/2016 Nagasaka et al.
9,672,734 B1 6/2017 Ratnasingam
(Continued)

*Primary Examiner* — Jaime Figueroa
*Assistant Examiner* — Mohamad O El Sayah
(74) *Attorney, Agent, or Firm* — Perkins Coie LLP

(57) ABSTRACT

A method of operating an autonomous vehicle includes detecting, based on an input received from a sensor of an autonomous vehicle that is being navigated by an on-board computer system, an occurrence of a driving event, making a determination by the on-board computer system, upon the detecting the occurrence of the driving event, whether or how to alter the path planned by the on-board computer system according to a set of rules, and performing further navigation of the autonomous vehicle based on the determination until the driving event is resolved. The driving event may include a presence of an object in a shoulder area of the road. The driving event may include accumulation of more than a certain number of vehicles behind the autonomous vehicle. The driving event may include a slow vehicle ahead of the autonomous vehicle. The driving event may include a do-not-change-lane zone is within a threshold.

20 Claims, 3 Drawing Sheets

(51) Int. Cl.
*B60W 30/09* (2012.01)
*B60W 30/095* (2012.01)
*B60W 30/14* (2006.01)
*B60W 30/18* (2012.01)
*B60W 40/04* (2006.01)
*B60W 40/06* (2012.01)
*G01C 21/34* (2006.01)
*G08G 1/16* (2006.01)

(52) U.S. Cl.
CPC ......... *G01C 21/3461* (2013.01); *G08G 1/167* (2013.01); *B60W 2420/403* (2013.01); *B60W 2420/408* (2024.01); *B60W 2520/10* (2013.01); *B60W 2554/20* (2020.02); *B60W 2554/4042* (2020.02); *B60W 2554/801* (2020.02)

(58) Field of Classification Search
CPC .......... B60W 2420/52; B60W 2520/10; G01C 21/3461; G08G 1/167
See application file for complete search history.

(56) References Cited

U.S. PATENT DOCUMENTS

| | | |
|---|---|---|
| 9,766,626 B1 | 9/2017 | Zhu et al. |
| 9,922,566 B1 | 3/2018 | Pereira |
| 2016/0231746 A1 | 8/2016 | Hazelton et al. |
| 2019/0027034 A1 | 1/2019 | Xu et al. |
| 2019/0263410 A1 | 8/2019 | Groult et al. |
| 2020/0047772 A1* | 2/2020 | Yasue .................. B60W 30/16 |
| 2020/0172094 A1 | 6/2020 | Kamatani et al. |
| 2020/0231146 A1 | 7/2020 | Miyano et al. |
| 2020/0307594 A1 | 10/2020 | Kato et al. |
| 2020/0391653 A1 | 12/2020 | Karunai-Ramanujam |
| 2021/0041869 A1 | 2/2021 | Meyer |
| 2022/0063627 A1 | 3/2022 | Hashimoto |
| 2022/0066459 A1 | 3/2022 | Jain et al. |
| 2022/0161821 A1 | 5/2022 | Shi et al. |
| 2022/0203992 A1* | 6/2022 | Taniguchi ............. G08G 1/167 |

* cited by examiner

AUTONOMOUS VEHICLE HANDLING IN UNUSUAL DRIVING EVENTS

CROSS-REFERENCE TO RELATED APPLICATIONS

This document is a continuation of U.S. patent application Ser. No. 17/105,073, filed on Nov. 25, 2020. The aforementioned application of which is incorporated by reference in its entirety.

TECHNICAL FIELD

This document relates to systems, apparatus, and methods enabling an autonomous vehicle to handle unusual driving conditions.

BACKGROUND

Autonomous vehicle navigation is a technology that can allow a vehicle to sense the position and movement of vehicles around an autonomous vehicle and, based on the sensing, control the autonomous vehicle to safely navigate towards a destination. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, an autonomous vehicle may be driven by itself, without a driver, using an autonomous vehicle control systems and navigation technology. Autonomous vehicles may be subject to various road driving conditions and situations.

SUMMARY

The present document describes techniques that can be adopted by various autonomous vehicle methods, apparatus and systems to detect and react to unusual driving situations that may arise due to unusual driving events. Examples of unusual situations may include—noticing a vehicle parked in an emergency lane, detecting a traffic backlog behind the autonomous vehicle, a situation where autonomous vehicle may have to overtake another vehicle from a slower speed lane, nearing a no-lane-change zone in which the autonomous vehicle should not change lanes, and so on.

In one example aspect, a method of operating an autonomous vehicle is disclosed. The method includes detecting, based on an input received from a sensor of an autonomous vehicle that is being navigated by an on-board computer system, an occurrence of a driving event, making a determination by the on-board computer system, upon the detecting the occurrence of the driving event, whether or how to alter the path planned by the on-board computer system according to a set of rules, and performing further navigation of the autonomous vehicle based on the determination until the driving event is resolved. The driving event may include a presence of an object in a shoulder area of the road. The driving event may include accumulation of more than a certain number of vehicles behind the autonomous vehicle. The driving event may include a slow vehicle ahead of the autonomous vehicle. The driving event may include a do-not-change-lane zone is within a threshold.

In another example aspect, an autonomous vehicle system is disclosed. The system includes a sensor installed on an autonomous vehicle, the sensor configured to detect driving conditions, and an on-board computer system configured to navigate the autonomous vehicle. The on-board computer system is further configured to detect, based on the input, occurrence of a driving event; make a determination, upon the detecting the occurrence of the driving event, whether or how to alter a planned path according to a set of rules; and perform further navigation of the autonomous vehicle based on the determination until the driving event is resolved. The driving event comprises: (1) a presence of an object in a shoulder area of the road, or (2) accumulation of more than a certain number of vehicles behind the autonomous vehicle, or (3) a slow vehicle ahead of the autonomous vehicle, or (4) a do-not-change-lane zone is within a threshold.

In yet another example aspect, a computer readable medium having code stored thereon is disclosed. The code, when executed by a computer causes the computer to implement a method. The code includes instructions for detecting, based on an input received from a sensor of an autonomous vehicle that is being navigated by the computer, an occurrence of a driving event; making a determination, upon the detecting the occurrence of the driving event, whether or how to alter the path planned by the on-board computer system according to a set of rules; and performing further navigation of the autonomous vehicle based on the determination until the driving event is resolved. The driving event may include (1) a presence of an object in a shoulder area of the road, or (2) accumulation of more than a certain number of vehicles behind the autonomous vehicle, or (3) a slow vehicle ahead of the autonomous vehicle, or (4) a do-not-change-lane zone is within a threshold.

The above and other aspects and their implementations are described in greater detail in the drawings, the descriptions, and the claims.

DETAILED DESCRIPTION

Figure 1:
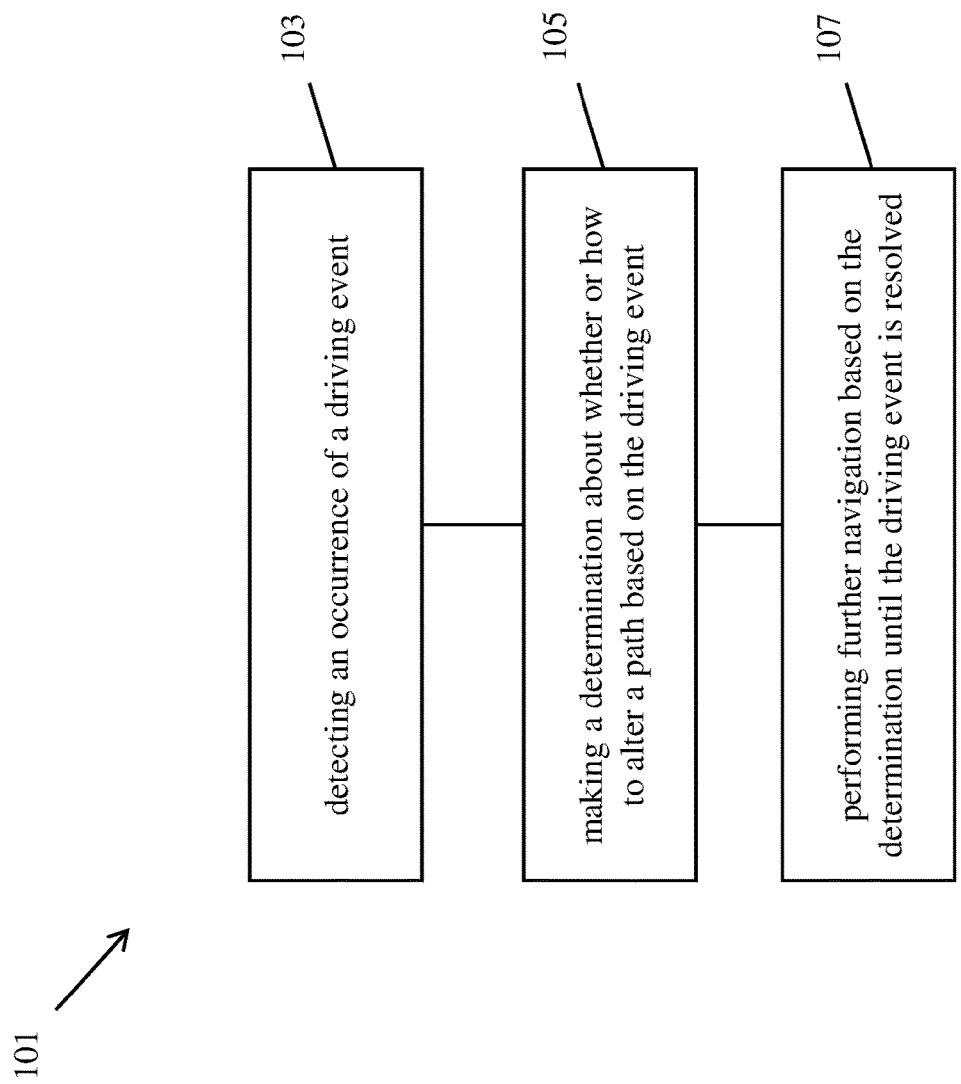
FIG. 1 is a flowchart of an example method of handling unusual driving events.

From the time automobiles were introduced to streets over a century ago, at which time the automobiles were fully controlled by the driver, to now, more and more control of the driving of any automobile is performed by an on-board computer. Over a number of years after their initial introduction, automobile navigation and control functions are more frequently being performed automatically and less often with direct human control.

In the recent years, there has been a lot of research and development in software and hardware that can lead to completely autonomous vehicles that are able to drive an automobile without any human control. The gradual progression of automobiles from the early days of "manual everything" to the near future "computer everything" driving models is sometimes captured with levels of automation. For example, the early automobiles where a human controlled the entire operation, are designated "L0" level cars. In an L1 autonomous vehicle, a human operator still controls the vehicle, but several functions such as stability control, throttle/cruise control etc. are being performed by computers. In L2 vehicles, computers take on additional tasks such as monitoring vehicles around it, observing lane control, and so on. For L3 vehicles, it is expected that the automobile will be able to completely navigate itself but will still require a human driver to be in the driver seat for intervention, if needed. L4 and L5 cars are expected to drive themselves in almost all environments and without human intervention. L4 cars may defer to a human driver in difficult situations such as adverse weather events or unusual topographies, whereas L5 cars will be capable of driving exactly like, or better than, a human driver.

When human drivers are driving or city streets and highways, most of the time, the surrounding traffic situation, including other vehicles and geographical features, operate in a relatively predictable manner. Through driving experience, human drivers often develop a judgement regarding how other nearby vehicles will react to road situations. Usual traffic scenarios include vehicles driving at approximately similar speeds and following lanes, with occasional lane changes occurring. Such conditions are often experienced on highways where drivers can often engage cruise control of their vehicle and allow the vehicle to proceed at a constant speed. However, unusual driving conditions occasionally occur that require quick decision and/or maneuvering by the driver. For example, one unusual situation may be that one or more vehicles are parked in the emergency lane or on a shoulder of the road. Another unusual situation may be that a large number of vehicles may get backed up behind a slow driving vehicle. Such a situation often is experienced when commercial vehicles such as trucks travel at a relatively slow speed compared to passenger vehicles in hilly areas and winding roads. Yet another unusual situation may occur that a vehicle is moving at a speed that is significantly lower that the average speed of surrounding traffic. Vehicles that travel at speeds of 10 or 20 or more miles per hour lower than surrounding vehicles often pose traffic danger that require surrounding vehicles to change their driving course. Another unusual situation, especially applicable to commercial vehicles such as semi trucks, may relate to lane control rules. In certain regions, trucks can only drive in designated lanes of a road. Yet another unusual situation may be that a vehicle may drive to a position where it is now within a distance of its intended exit. In such as case, the vehicle, especially a large vehicle such as a truck, may prefer to stay in the exit lane for some distance prior to the exit (e. g. 2 to 5 miles prior to the exit).

Present day autonomous vehicle navigation often works by path planning based on a set of rules that use sensory inputs such as an image of the road ahead and controlling navigation of the autonomous vehicle for a short future interval (e.g., next 1 or 2 seconds). This process is repeated until the autonomous vehicle reaches its final destination or comes to a stop. During the entire travel, the sensory inputs (e.g., a camera input or input from a LIDAR, etc.) and the rules used for path planning and navigation often stay same from one interval to the next because traffic situations usually don't change drastically. However, such a vehicular navigation planning will either entirely miss noticing and reacting to an unusual traffic situation as described herein. In some cases, even when the autonomous vehicle notices an unusual driving condition, it may not be equipped with specific action rules to maneuver around the unusual driving condition.

The present document describes several techniques that may benefit an autonomous vehicle by complementing existing navigation control logic with additional capability to identify and react to unusual driving situations. In the present document, an autonomous vehicle that uses at least some automated driving support is sometimes also referred to as EGO.

As previously described, in most autonomous driving situations, the EGO is provided with a starting address and a destination address. The EGO typically plans a route and travels along the route by typically staying close to the planned route. However, real world is often unpredictable and unexpected and unusual driving events may occur during EGO driving that may require the EGO to react in real-time. An unusual event may be, for example, an event that occurs with low frequency during travel, or an event which may cause EGO to re-evaluate, and potentially deviate from, its planed trajectory in a certain future time period. In some cases, an unusual event may be a road condition that is specifically addressed by a local rule or a traffic regulation in the area in which EGO is driving, which causes the EGO to re-evaluate, and possibly alter, its planned route.

FIG. 1 shows a flowchart for a method 101 that may be used in some embodiments. The method 101 may be implemented by an on-board computer system of the EGO. One example implementation of the on-board computer system is describer with respect to FIG. 2.

The method 101 includes, at 103, detecting, based on an input received from a sensor of an autonomous vehicle that is being navigated by an on-board computer system, an occurrence of a driving event, for example, an unusual driving event.

The method 101 includes, at 105, making a determination by the on-board computer system, upon the detecting the occurrence of the driving event, whether or how to alter the path planned by the on-board computer system according to a set of rules.

The method 101 includes, at 107, performing further navigation of the autonomous vehicle based on the determination until the driving event is resolved.

Various driving events, for example, unusual driving events, may include (1) a presence of an object in a shoulder area of the road, or (2) accumulation of more than a certain number of vehicles behind the autonomous vehicle, or (3) a slow vehicle ahead of the autonomous vehicle, or (4) the EGO is approaching a do-not-change-lane zone and is within a threshold distance.

Some example embodiments for handling of various unusual situations are described in the present document, including the following sections. However, section headings are added simply for ease of readability and do not limit scope of a technique only to a respective section in which the technique is described.

A. Example 1: Emergency Lane Vehicle Handling

One example of an unusual event may be that EGO notices a vehicle parked in an emergency lane (emergency lane vehicle, ELV). Prior to noticing the ELV, EGO may be traveling along a planned route in a traffic lane. However, upon detecting presence of the ELV, EGO may re-evaluate the planned route by taking into consideration safety EGO, safety of the ELV and any local regulations that require EGO to make changes to the planned route.

Figure 2:
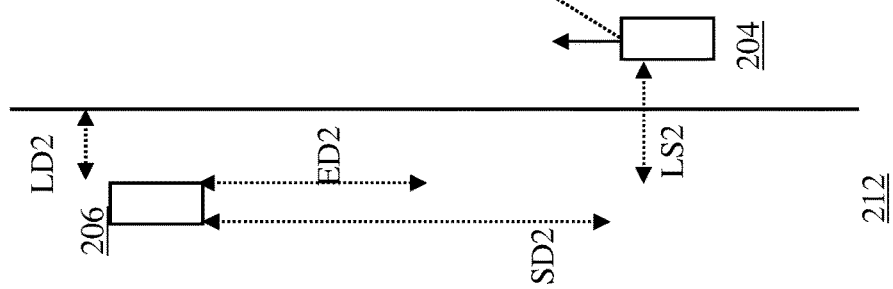
FIG. 2 shows examples of a situation in which a vehicle is parked in an emergency lane.
Figure 2:
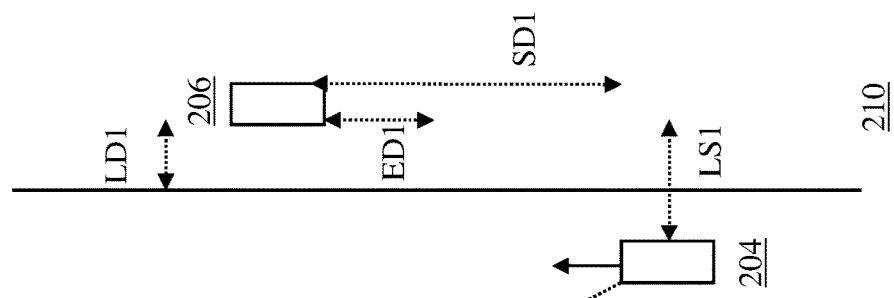

FIG. 2 shows two example scenarios for emergency lane handling. In scenario 200, a vehicle 206 is parked in an emergency lane (210) that is the rightmost lane in relation to the EGO (shows as 204) driving in a direction from the bottom of the figure to the top of the figure. In scenario 202, the vehicle 206 is parked in an emergency lane (212) that is to the left of the lane in which the EGO is traveling.

Depending on which side of the road vehicles drive on, these drawings show the situations when the emergency vehicle is parked in a shoulder (210 or 212) nearest the fast speed lane or the slow speed (or exit) lane.

FIG. 2 further shows certain distances that may be taken into account during handling of this unusual traffic event of a vehicle 206 being in the emergency lane. In general, the vehicle 206 may also be another object, e.g., bicyclist, or a motorcycle or a trailer portion of a truck or a cables truck, or simply an object that is large enough to cause a driving disruption for the EGO.

As shown in FIG. 2, a lateral distance LD1 and a lateral distance LD2 represent lateral distances between the lane in which the EGO is traveling and the ELV in cases that the emergency lane is to the right or to the left, respectively. Similarly, a lateral separation LS1 and a lateral separation LS2 represent lateral separation between the EGO and the ELV in these two cases.

Starting distance SD1 and starting distance SD2 may represent starting distances from the ELV at which the EGO may make changes to its planned path, as further described in the present document.

Ending distance ED1 and ending distance ED2 may represent the ending distances from the ELV at which the EGO may attempt to finish its lane change, as further described in the present document. As further described in the present document, various distance values used for the event in which the ELV is in the fast lane side emergency lane or the event in which the ELV is in a slow lane side emergency lane (typically right lane in the United States) may either be same or different, depending on embodiments. For example, in various embodiments, values of lateral distance LD1 may be equal to lateral distance LD2, starting distance SD1 may be equal to starting distance SD2, lateral separation LS1 may be equal to lateral separation LS2, and ending distance ED1 may be equal to ending distance ED2 as further described herein.

A.1 Make a Lane Change

In some cases, EGO may determine that EGO is driving in a traffic lane that is next to the emergency shoulder (e.g., FIG. 2). Upon this determination, EGO may initiate a safe lane change to another lane that is farther away from the emergency shoulder.

In some cases, EGO may detect that it is not driving in a lane that is immediately adjacent to the shoulder lane, and therefore may maintain the current position and speed and not make a lane change into the ELV's adjacent lane. Here, the immediately adjacent lane may be the lane that shares a lane separator demarcation with the shoulder lane.

A.2 Conditional Lane Change/Slow Down Behavior

In some cases, EGO may make a determination of how far the ELV is from a closest edge of the traffic lane in which EGO is traveling or closes edge of EGO (e.g., lateral distance LD1 or lateral distance LD2 in FIG. 2). If the ELV stops at a lateral distance greater than a certain distance (e.g., 4 feet or 1.3 m from EGO), EGO may make a lance change least a predetermined distance (e.g., 500 ft or 152 m) away from the ELV, if possible. EGO may finish the lane change before EGO's backmost end (e.g., a tractor in the back) reaches to the tail of ELV. If EGO determines that a lane change is not possible, EGO may slow down at least a predetermined distance (e.g., 500 ft or 152 m) prior to ELV position.

In some cases, EGO may take bias to pass ELV. For example, if ELV is on EGO's right hand side, EGO may move slightly to left within its lane. Similarly, if ELV is on EGO's left hand side, EGO may move slightly towards right in its lane. For example, in such cases, the EGO may estimate LS1 or LS2 (lateral separation) from the ELV and maneuver to increase the lateral separation to be above a certain value.

In case that EGO determines that the lateral distance (LD1 or LD2) between ELV and EGO is too close (e.g., within 4 feet or 1.3 m), EGO may perform one of the following corrective action:

A. The EGO may look for a lane change opportunity continuously before reaching ELV and make a lane change when safe.
B. If a lane change is not possible, slow down a predetermined distance, prior to ELV, e.g., 500 ft, and perform a partial lance change when approaching ELV.
C. If the adjacent lane is clear when reaching ELV, EGO may keep a safe lateral distance, e.g., 4 feet or more, and pass.
D. If EGO is unable to make a partial lane change to pass, EGO may slow down and keep the distance as far as possible from ELV.
E. In case that EGO notices that ELV's door is opening during the passage, EGO will initiate an emergency road handling process.

A.3 Notice, But Not React to ELV

In some cases, EGO may notice the ELV. However, if the stationary vehicle is a sufficient distance (e.g., 3.75 meters) away from the shoulder, EGO may decide that there is no need to make a changed to previously planned route. In such a case, in spite of detecting an unusual driving event, the on-board computer may not make any change to previously planned vehicle route.

A.4 an Example of Speed Setting for Passing ELV on Adjacent Lane

In some cases, EGO may use a relationship between its current speed and a lateral distance of ELV (e.g., lateral distances LD1, LD2, or lateral separations LS1 or LS2) to make one of the above-described decisions. Table 1 below shows an example of such a relationship.

TABLE 1

|  | Lateral Distance between EGO and ELV | |
| --- | --- | --- |
| Posted Speed Limit | Greater than 1.3 m | Greater than 1.3 m |
| 75 mph | 65 mph | 55 mph |
| 65 mph | 55 mph | 50 mph |
| 55 mph | 50 mph | 45 mph |

A.5 Bias Distance Setting for Passing ELV on Adjacent Lane

In the above-described scenarios, in case that EGO decides to pass ELV by taking a bias within its own lane, EGO may use a relationship between a measured lateral distance (LD1 or LD2), a type of vehicle on a side towards which EGO biases and a target lateral bias distance limit. An example is provided in Table 2.

TABLE 2

| Lateral Distance between the emergency lane line and the ELV | Type of vehicles on the left side | Lateral Bias Distance |
|---|---|---|
| Greater than 1.3 m | — | No need to take bias |
| Lower than or equal to 1.3 m | Passenger vehicles | 0.15-0.2 m |
| Lower than or equal to 1.3 m | Over-sized vehicles/trucks | No need to take bias |

B. Example 2: Passing a Vehicle

Another example of an unusual driving event includes encountering a slow vehicle that is going at a slower speed than EGO's speed in EGO's path, e.g., the lane in which the EGO is traveling. The EGO may consider a vehicle to be a slow vehicle in case that the difference between EGO's current speed and an estimated speed of the slow vehicle's travel is greater than a threshold. For example, the threshold may be 10 or 15 or 20 miles per hour. This threshold for classifying a vehicle as a slow vehicle may depend on current speed or a posted speed limit in the position where EGO is driving.

For example, Table 3 shows an example of how the threshold may change as a function of speed limit. In this example, the threshold is approximately 10 to 20 miles per hour. In some examples, the threshold may decrease with a decrease in the speed limit. For example, this may take into account the effort required to brake the EGO in case overtaking is not possible.

TABLE 3

| Speed Limit mph | EGO can consider to pass when leading vehicle is (miles per hour) |
|---|---|
| 75 | below 55 |
| 70 | below 55 |
| 65 | below 50 |
| 60 | below 45 |
| 55 | below 45 |
| 50 | below 35 |
| 45 | below 30 |
| 35 | below 20 |

B.1 Not Block the Traffic

Another example of an unusual event is that the EGO notices that more than a certain number of vehicles have been blocked up behind EGO because of EGO's speed. Some regions have specific regulations regarding such situations. For example, California driving code or Arizona driving code require slower vehicles to pull over and allow faster vehicles to pass.

Upon noticing this unusual event, the EGO may initiate a lane change and safely make the lane change.

C. Example 3: Selection of a Passing Lane

As previously described in Section B, the EGO may decide to overtake a slow moving vehicle. In such a case, the EGO may have to make a decision about whether to pass from a left lane or a right lane of the slow moving vehicle. The EGO may take into consideration various operational conditions such as local regulations, safety considerations and the possibility of encountering other potential unusual events as described in the present document

D. Example 4: No Passing Zone Selection

Another example of an unusual event includes the driving event that a do-not-change-lane zone is within a threshold. Such a zone may be, for example, an upcoming no passing zone or an upcoming exit that the EGO is to take or an upcoming commercial lane control region. The EGO may consider the following options when such an unusual driving event is noticed.

In some embodiments, the EGO may decide within a particular distance from the exit (e.g., 1, 2 or 5 miles) before the exit, the EGO will not make any additional lane changes.

In some embodiments, the EGO may have come within a particular distance (e.g., 1, 2 or 5 miles) before a no commercial vehicles zone. In such an event, the EGO may decide to stay in lanes where a commercial vehicle is allowed.

In some embodiments, the EGO may have come within a particular distance (e.g., 1, 2 or 5 miles) before a lane that will exit the highway. In such a case, the EGO may decided to not change lane during the time that the EGO covers the particular distance.

Figure 3:
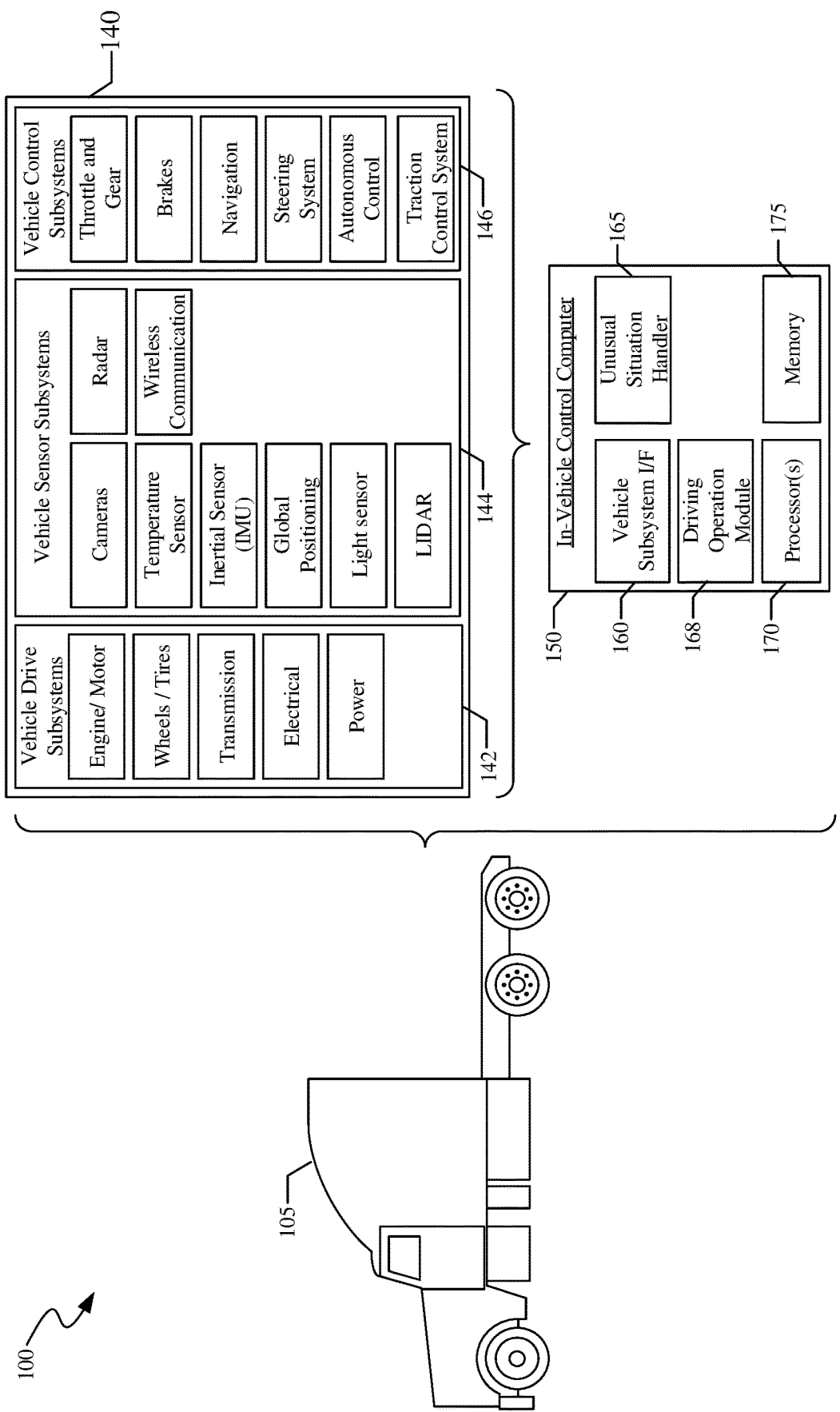
FIG. 3 shows a block diagram of an example vehicle ecosystem in which an in-vehicle control computer located in the vehicle is configured to handle unusual traffic conditions.

FIG. 3 shows a block diagram of an example vehicle ecosystem 100 in which an in-vehicle control computer 150 located in the autonomous vehicle 105 can generate and send a data package to a health-check device. As shown in FIG. 3, the autonomous vehicle 105 may be a semi-trailer truck. The vehicle ecosystem 100 includes several systems and components that can generate and/or deliver one or more sources of information/data and related services to the in-vehicle control computer 150 that may be located in an autonomous vehicle 105. The in-vehicle control computer 150 can be in data communication with a plurality of vehicle subsystems 140, all of which can be resident in the autonomous vehicle 105. The in-vehicle computer 150 and the plurality of vehicle subsystems 140 can be referred to as autonomous driving system (ADS). A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The autonomous vehicle 105 may include various vehicle subsystems that support the operation of autonomous vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems. Alternatively, in some embodiments, one or more components or devices can be removed from the various subsystems. The vehicle drive subsystem 142 may include components operable to provide powered motion for the autonomous vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment in which the autonomous vehicle 105 is operating or a condition of the autonomous vehicle 105. The vehicle sensor subsystem 144 may include one or more cameras or image capture devices, one or more temperature sensors, an inertial measurement unit (IMU), a Global Positioning System (GPS) device, a laser range finder/LiDAR unit, a RADAR unit, and/or a wireless communication unit (e.g., a cellular communication transceiver). The vehicle sensor subsystem 144 may also include sensors configured to monitor internal systems of the autonomous vehicle 105 (e.g., an 02 monitor, a fuel gauge, an engine oil temperature, etc.) In some embodiments, the vehicle sensor subsystem 144 may include sensors in addition to the sensors shown in FIG. 3.

The IMU may include any combination of sensors (e.g., accelerometers and gyroscopes) configured to sense position and orientation changes of the autonomous vehicle 105 based on inertial acceleration. The GPS device may be any sensor configured to estimate a geographic location of the autonomous vehicle 105. For this purpose, the GPS device may include a receiver/transmitter operable to provide information regarding the position of the autonomous vehicle 105 with respect to the Earth. The RADAR unit may represent a system that utilizes radio signals to sense objects within the environment in which the autonomous vehicle 105 is operating. In some embodiments, in addition to sensing the objects, the RADAR unit may additionally be configured to sense the speed and the heading of the objects proximate to the autonomous vehicle 105. The laser range finder or LiDAR unit may be any sensor configured to sense objects in the environment in which the autonomous vehicle 105 is located using lasers. The cameras may include one or more cameras configured to capture a plurality of images of the environment of the autonomous vehicle 105. The cameras may be still image cameras or motion video cameras.

The vehicle control subsystem 146 may be configured to control operation of the autonomous vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the autonomous vehicle 105. The gear may be configured to control the gear selection of the transmission. The brake unit can include any combination of mechanisms configured to decelerate the autonomous vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the autonomous vehicle 105. The navigation unit may additionally be configured to update the driving path dynamically while the autonomous vehicle 105 is in operation. In some embodiments, the navigation unit may be configured to incorporate data from the GPS device and one or more predetermined maps so as to determine the driving path for the autonomous vehicle 105. The steering system may represent any combination of mechanisms that may be operable to adjust the heading of autonomous vehicle 105 in an autonomous mode or in a driver-controlled mode.

The autonomous control unit may represent a control system configured to identify, evaluate, and avoid or otherwise negotiate potential obstacles in the environment of the autonomous vehicle 105. In general, the autonomous control unit may be configured to control the autonomous vehicle 105 for operation without a driver or to provide driver assistance in controlling the autonomous vehicle 105. In some embodiments, the autonomous control unit may be configured to incorporate data from the GPS device, the RADAR, the LiDAR, the cameras, and/or other vehicle subsystems to determine the driving path or trajectory for the autonomous vehicle 105.

The traction control system (TCS) may represent a control system configured to prevent the autonomous vehicle 105 from swerving or losing control while on the road. For example, TCS may obtain signals from the IMU and the engine torque value to determine whether it should intervene and send instruction to one or more brakes on the autonomous vehicle 105 to mitigate the autonomous vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the autonomous vehicle 105 can be controlled by the in-vehicle control computer 150. The in-vehicle control computer 150 may include at least one processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the autonomous vehicle 105 in a distributed fashion. In some embodiments, the memory 175 may contain processing instructions (e.g., program logic) executable by the processor 170 to perform various methods and/or functions of the autonomous vehicle 105, including those described for the health module 165 and the driving operation module 168 as explained in this patent document. For instance, the processor 170 executes the operations associated with health module 165 for performing a determining operation in which the autonomous vehicle 105 is determined to be within a pre-determined distance of a location of a health-check device, and for generating and sending a data package to the health-check device in response to the determining operation. The operations of the health module 165 are further described in this patent document. The processor 170 executes the operations associated with driving operation module 168 for determining driving related operations of the autonomous vehicle 105 based on a message received from the health-check device.

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 may control the function of the autonomous vehicle 105 based on inputs received from various vehicle subsystems (e.g., the vehicle drive subsystem 142, the vehicle sensor subsystem 144, and the vehicle control subsystem 146).

In some embodiments, an autonomous vehicle system (e.g., as depicted in FIG. 3) may include a sensor installed on an autonomous vehicle (e.g. one or more of sensors 144), and an on-board computer system (e.g., the in-vehicle control computer 150). The sensor configured to detect driving conditions. For example, sensors may capture images of road ahead, surrounding area near the EGO, and so on.

The on-board computer system is configured to receive an input from the sensor. The input may include a digital image, a Lidar image, or other measurements of surrounding environment such as temperature, humidity, and so on.

The on-board computer system is configured to detect, based on the input, occurrence of a driving event, make a determination, upon the detecting the occurrence of the driving event, whether or how to alter a planned path according to a set of rules. The occurrence of a driving event may be determined, for example, by analyzing images received from the sensor and comparing with a pre-determined set of rules such as described with reference to FIG. 2.

The on-board computer system is configured to perform further navigation of the autonomous vehicle based on the determination until the driving event is resolved. Various techniques used for the navigation are described in Section A, B, C and D of the present document.

As described in Sections A to D, the driving event may include (1) a presence of an object in a shoulder area of the road, or (2) accumulation of more than a certain number of vehicles behind the autonomous vehicle, or (3) a slow vehicle ahead of the autonomous vehicle, or (4) a do-not-change-lane zone is within a threshold.

In some embodiments, in case that the certain number of vehicles is greater than a regulatory limit in a driving area of the autonomous vehicle, the on-board computer system allows the vehicle behind the autonomous to pass by making a lane change. As further described in Section B, the number of vehicles that are accumulated behind the autonomous vehicle, which requires the autonomous vehicle to give way, may changes from jurisdictional regions (e.g., a different number may be mandated in California compared to Arizona), or from regional topographies (e.g., a different number may be used in hilly area than a plane area).

In some embodiments, the on-board computer system determines a front vehicle to be a slow vehicle based on at least one of a posted speed limit, an estimated speed of the front vehicle and a current speed of the autonomous vehicle. In some embodiments, the estimated speed difference may be tracked for a period of time such as 1 to 3 minutes before making a decision regarding overtaking the slow vehicle. In some embodiments, if the instantaneous measured difference is a large number (e.g., above a threshold such as greater than 30 miles per hour) then the time period of averaging may be proportionally shortened. For example, at a high speed difference such as 30 miles per hour or more, the autonomous vehicle may need to react quickly to mitigate the situation.

In some embodiments, the front vehicle is determined to be a slow vehicle in cases that the estimated speed of the front vehicle is a margin less than the posted speed limit. In some embodiments, the margin changes with the posted speed limit. Some examples are discussed in Section B.

In some embodiments, the driving event is that an exit that is to be taken by the autonomous vehicle is within the threshold, and wherein the on-board computer system is configured to: determine whether the autonomous vehicle is already in a lane closest to the exit; and in case that the autonomous vehicle is not already in the lane closest to the exit, changing a current lane to the lane closest to the exit, and disabling further lane changes until the autonomous vehicle exits using the exit. Some examples are disclosed in Section D.

In some embodiments, the driving event comprises detecting the presence of the object in the shoulder area of the road; and wherein the on-board computer system is configured to: determine whether a lateral distance between the object and a current position of the autonomous vehicle is less than a safe lateral distance; and in case that the lateral distance is less than the safe lateral distance, maneuver the autonomous vehicle to increase lateral separation from the object to be greater than the safe lateral distance, or slow down the autonomous vehicle.

In some embodiments, the shoulder area is to the left of the autonomous vehicle. Scenario 202 depicted in FIG. 2 is one such example.

In some embodiments, a computer readable medium may be used for facilitating use of some of the techniques disclosed in the present document. The computer readable medium may have code stored upon it. The code, when executed by a computer comprising one or more processors, causes the computer to implement a technique described in the present document. The code may include instructions for detecting, based on an input received from a sensor of an autonomous vehicle that is being navigated by the computer, an occurrence of a driving event; making a determination, upon the detecting the occurrence of the driving event, whether or how to alter the path planned by the on-board computer system according to a set of rules; and performing further navigation of the autonomous vehicle based on the determination until the driving event is resolved; wherein the driving event comprises: (1) a presence of an object in a shoulder area of the road, or (2) accumulation of more than a certain number of vehicles behind the autonomous vehicle, or (3) a slow vehicle ahead of the autonomous vehicle, or (4) a do-not-change-lane zone is within a threshold.

In some embodiments, the driving event comprises detecting the presence of the object in the shoulder area of the road, and wherein the performing further navigation comprises altering a future path according to a relationship between a current speed of the autonomous vehicle and a lateral distance of the object.

In some embodiments, the driving event comprises detecting the slow vehicle ahead of the autonomous vehicle and initiating a lane change into a new lane to overtake the slow vehicle.

In some embodiments, the new lane is determined in an order due to more than one lane being available for the lane change, wherein the order comprises preferring changing lane to a first lane that is a designated passing lane over a second lane that is a designated lane for slower vehicles.

In some embodiments, the driving event further comprises detecting a regulation that, at the current position of the autonomous vehicle, commercial vehicles are restricted to designated lanes, and maneuvering the autonomous vehicle to comply with the regulation.

In this document the term "exemplary" is used to mean "an example of" and, unless otherwise stated, does not imply an ideal or a preferred embodiment. In the patent document the term "autonomous vehicle" or EGO is used to describe features of the operations. However, the techniques described in this patent document can be applied to other kinds of vehicles such as semi-autonomous vehicles.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of operating an autonomous vehicle, comprising:
   planning a path, by an onboard computer system, for driving the autonomous vehicle between a starting address and a destination address;
   making a determination by the on-board computer system, upon a detecting an occurrence of any of a number of driving events detected based on an input, whether or how to alter the path according to a set of rules; and
   performing further navigation of the autonomous vehicle based on the determination;
   wherein the driving events include (1) a presence of an object in a shoulder area of a road, wherein a rule in the set of rules specifies that how to alter the path depends on a type of the object in the shoulder area, a measured lateral distance limit and a target lateral distance limit, (2) accumulation of more than a certain number of vehicles behind the autonomous vehicle, (3) detecting a slow vehicle ahead of the autonomous vehicle based on an estimated speed of the slow vehicle ahead, a current speed of the autonomous vehicle and a first threshold, and (4) a do-not-change-lane zone is within a second threshold, wherein the second threshold is a non-monotonic function of a posted speed limit;
   wherein the performing the further navigation includes, initiating, upon the detecting the slow vehicle, a lane change into a new lane to pass the slow vehicle.

2. The method of claim 1, wherein the lane change depends whether a difference between the current speed of the autonomous vehicle and the estimated speed of the slow vehicle ahead is greater than the threshold.

3. The method of claim 1, wherein the new lane is determined in an order in case that more than one lane are available for the lane change.

4. The method of claim 3, wherein the order comprises preferring changing lane to a first lane that is a designated passing lane over a second lane that is a designated lane for slower vehicles.

5. The method of claim 1, wherein the set of rules specifies that in case that the autonomous vehicle is driving in a traffic lane that is not immediately adjacent to the shoulder area, then the determination is to continue the navigation of the autonomous vehicle without altering the path planned previously.

6. The method of claim 5, wherein the making the determination comprises determining whether to steer away from the shoulder area based on a lateral distance.

7. The method of claim 6, wherein the further navigation based on the determination to steer away from the shoulder area comprises:
   determining whether a safe lane change away from the shoulder area is possible, and
   in case that the safe lane change is possible, making the safe lane change; or
   in case that the safe lane change is not possible, biasing within the current lane in a direction away from the shoulder area.

8. The method of claim 7, further comprising:
   reducing vehicle speed prior to reaching within a first distance from the object, wherein the first distance is a function of a speed of the autonomous vehicle at a time the object was detected.

9. The method of claim 8, wherein the first distance is further dependent on the lateral distance.

10. An autonomous vehicle system, comprising:
   an on-board computer system configured to navigate the autonomous vehicle,
   wherein the on-board computer system is further configured to:
   plan a path for driving the autonomous vehicle between a starting address and a destination address;

make a determination, upon a detecting an occurrence of any of a number of driving events detected based on an input, whether or how to alter a planned path according to a set of rules; and perform further navigation of the autonomous vehicle based on the determination until the driving event is resolved;

wherein the driving events include (1) a presence of an object in a shoulder area of a road, wherein a rule in the set of rules specifies that how to alter the path depends on a type of the object in the shoulder area, a measured lateral distance limit and a target lateral distance limit, (2) accumulation of more than a certain number of vehicles behind the autonomous vehicle, (3) detecting a slow vehicle ahead of the autonomous vehicle based on an estimated speed of the slow vehicle ahead, a current speed of the autonomous vehicle and a first threshold, and (4) a do-not-change-lane zone is within a second threshold, wherein the second threshold is a non-monotonic function of a posted speed limit;

wherein the performing the further navigation includes, initiating, upon the detecting the slow vehicle, a lane change into a new lane to pass the slow vehicle.

11. The system of claim 10, wherein the lane change depends whether a difference between the current speed of the autonomous vehicle and the estimated speed of the slow vehicle ahead is greater than the threshold.

12. The system of claim 10, wherein the threshold is a non-monotonic function of a posted speed limit.

13. The system of claim 12, wherein the slow vehicle ahead is determined in cases that the estimated speed of the slow vehicle ahead is a margin less than the posted speed limit.

14. The system of claim 13, wherein the margin changes with the posted speed limit.

15. The system of claim 10, wherein the new lane is determined in an order in case that more than one lane are available for the lane change.

16. The system of claim 15, wherein the order comprises preferring changing lane to a first lane that is a designated passing lane over a second lane that is a designated lane for slower vehicles.

17. An autonomous vehicle system, comprising:
an on-board computer system configured to navigate the autonomous vehicle,
wherein the on-board computer system is further configured to:
plan a path for driving the autonomous vehicle between a starting address and a destination address;
make a determination, upon a detecting an occurrence of any of a number of driving events detected based on an input, whether or how to alter a planned path according to a set of rules; and
perform further navigation of the autonomous vehicle based on the determination until the driving event is resolved;
wherein the driving events include (1) a presence of an object in a shoulder area of a road, wherein a rule in the set of rules specifies that how to alter the path depends on a type of the object in the shoulder area, a measured lateral distance limit and a target lateral distance limit, (2) accumulation of more than a certain number of vehicles behind the autonomous vehicle, (3) detecting a slow vehicle ahead of the autonomous vehicle based on an estimated speed of the slow vehicle ahead, a current speed of the autonomous vehicle and a first threshold, and (4) a do-not-change-lane zone is within a second threshold;
wherein the performing the further navigation includes, initiating, upon the detecting the slow vehicle, a lane change into a new lane to pass the slow vehicle;
wherein, in case that the certain number of vehicles is greater than a regulatory limit in a driving area of the autonomous vehicle, the on-board computer system allows the vehicle behind the autonomous to pass by making a lane change.

18. The system of claim 17, wherein the driving event is that an exit that is to be taken by the autonomous vehicle is within the second threshold, and wherein the on-board computer system is configured to:
disabling further lane changes until the autonomous vehicle exits using the exit.

19. The system of claim 17, wherein the driving event comprises detecting the presence of the object in the shoulder area of the road; and wherein the on-board computer system is configured to:
determine whether a lateral distance between the object and a current position of the autonomous vehicle is less than a safe lateral distance; and
in case that the lateral distance is less than the safe lateral distance, maneuver the autonomous vehicle to increase lateral separation from the object to be greater than the safe lateral distance, or slow down the autonomous vehicle.

20. The system of claim 17, wherein the second threshold is a non-monotonic function of a posted speed limit.

* * * * *